June 11, 1929.  C. G. WRIGHT  1,717,296
COOKER
Filed July 9, 1927  2 Sheets-Sheet 1
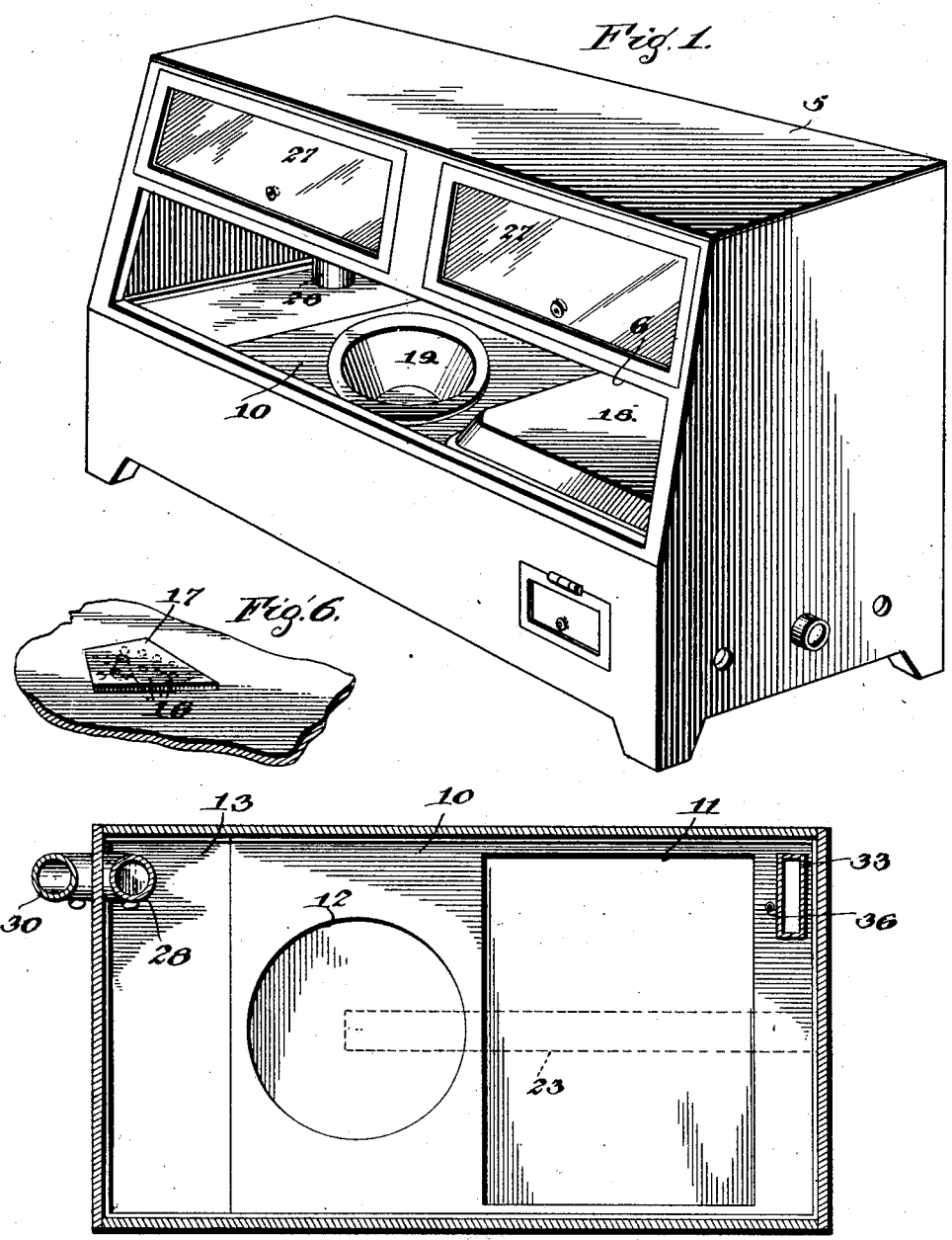

June 11, 1929.  C. G. WRIGHT  1,717,296
COOKER
Filed July 9, 1927   2 Sheets-Sheet 2
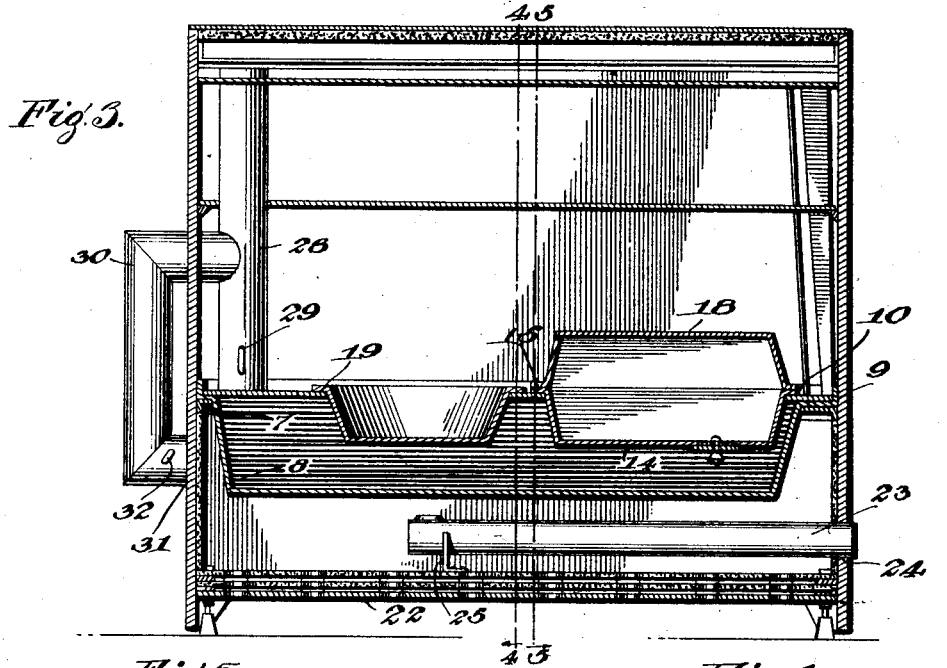
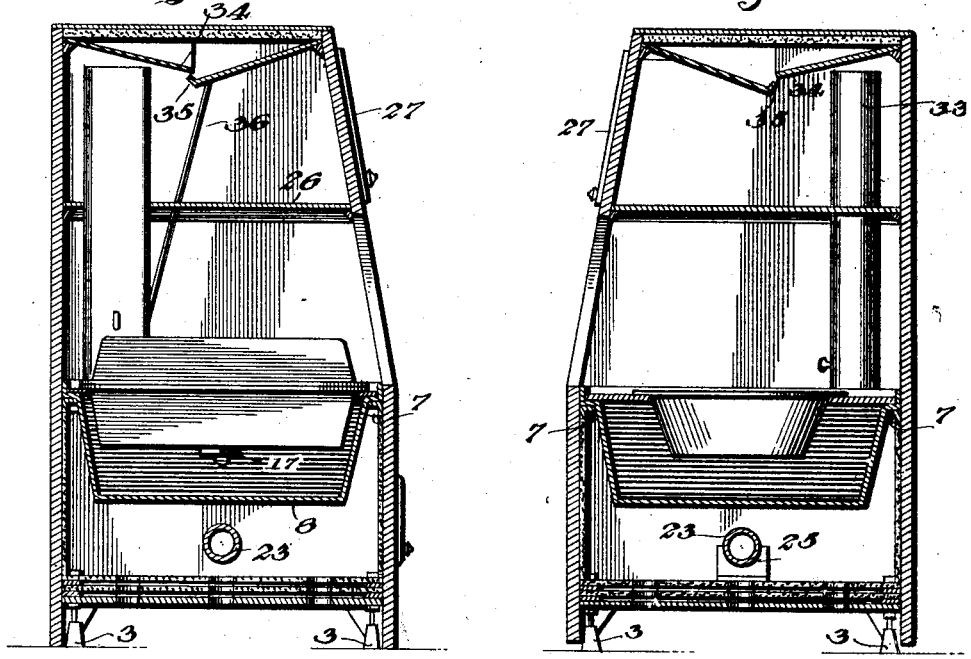
WITNESSES
S. H. Saylor
INVENTOR
C. G. Wright
BY Munn & Co
ATTORNEYS Patented June 11, 1929.

1,717,296

UNITED STATES PATENT OFFICE.

CLAIR GILBERT WRIGHT, OF CARTERVILLE, MISSOURI.

COOKER.

Application filed July 9, 1927. Serial No. 204,529.

My invention relates to cookers and its principal object is to provide a cooker wherein food products may be conveniently cooked, retained in heated condition and served therefrom by a vendor.

The invention further contemplates a combined cooker and serving cabinet wherein food products necessary in vending hot sandwiches are heated to cook and retain the products in a palatable condition and which is arranged to conduct heat and moisture to dried food products, such as bread, rolls or buns to soften and freshen the same.

Another object of the invention is to provide a sheet metal cooking cabinet or vending stand wherein various food products may be conveniently reached and handled and thereby facilitate cooking and vending of the same.

With the preceding and other objects and advantages in mind the invention consists in the combination of elements, constructions and arrangement of parts and operations to be hereinafter specifically referred to, claimed and illustrated in the accompanying drawings, wherein, Figure 1 is a perspective of a cooking cabinet constructed in accordance with my invention, Figure 2 is a horizontal sectional view of the same, Figure 3 is a vertical longitudinal sectional view, Figure 4 is a vertical transverse sectional view taken on the line 3—3 of Figure 3, Figure 5 is a similar view taken on the line 4—4 of Figure 3, and Figure 6 is a perspective of the steam control valve embodied in the invention.

Referring to the invention in detail a sheet metal rectangular casing or cabinet 5 having its front open from its upper edge to a point above its lower edge is provided.

Secured to the inner faces of the walls of the casing or cabinet 5 and extending horizontally along these walls at a point slightly below the lower edge of the open front are angle bars 7 for supporting a boiler or steamer 8, the latter having lateral marginal flanges 9 upon its upper edges resting upon the angle bars 7. A relatively large panel or shelf 10 for supporting receptacles is provided and has a large pan receiving opening 11 and a circular bowl receiving opening 12. This panel 10 removably rests upon the lateral marginal flanges 9 of the boiler or steamer 8 and is contiguous with a small removable panel 13 resting upon the lateral flanges 9 at one end of the casing or cabinet.

A cooking pan 14 for cooking edibles, such as frankfurters, is provided and is received in the opening 11 with its lateral flanges 15 resting upon the panel 10. A plurality of steam inlet openings 16 is provided in the bottom of the pan 14 through which steam from the boiler or steamer 8 is conducted to cook the contents of the pan. To control the passage of steam to the pan a damper 17 is pivoted to the underface of the latter. By moving this damper to one side or the other to partly uncover the openings 16, a predetermined quantity of steam may be admitted to the pan. A removable transparent closure 18 is normally superimposed on the pan to retain the steam therein.

A circular bowl or receptacle for retaining sauce is received in the opening 12 with its flange 19 resting upon the shelf or panel 10.

Laminations of asbestos 20 are secured to the the inner faces of the walls of the cabinet or casing below the angle bar 7, while a perforated asbestos bottom 22 is secured to the walls at their lower edges and constitute with the walls of the cabinet or casing below the shelf or panel 10 a fire box in which a heating coil 23 is supported. Adjustable supporting feet 3 are carried by the bottom 22. As illustrated in Figure 3 one end of the heating coil is received in an opening 24 in one of the end walls of the casing or cabinet while its opposite end rests in a recessed upstanding bracket 25 attached to the inner face of the bottom 22. While I have illustrated a heating coil it is apparent that I may use any other heating medium that may be found practical.

To provide for softening dried rolls, bread or buns, a compartment is provided which consists of a horizontal bottom or shelf 26 arranged below the top wall of the casing or cabinet and hinged doors 27 extending from the upper edge of the open front to the shelf or bottom 26.

In order to conduct steam from the boiler or steamer 8 to soften dried or stale rolls, buns, etc., a conduit 28 extending vertically through the shelf or bottom 26 has its lower end attached to the panel or shelf 13 and communicates with the boiler or steamer. A valve or damper 29 is provided in the lower end of the conduit 28 for controlling the admission of steam to the bread or roll compartment.

To normally supply moisture to the bread or roll compartment independently of the conduit 28 a U-shaped conduit 30 arranged exteriorly of the casing or cabinet has one leg leading to the fire box as at 31 and its opposite leg passed through the end wall of the casing or cabinet and communicates with the conduit 28 above the damper or valve 29. A similar damper or valve 32 is arranged in the lower leg of the conduit 30. A heat conducting conduit 33 is supported on the shelf or panel 10 at one end of the cabinet with its lower end in communication with the fire box and its opposite end extended through the shelf or bottom 26 to normally conduct heat to the bread or roll compartment. Under normal conditions the valve 29 is closed and the valve 32 open to permit heat to circulate through the conduit 30 and into the bread or roll compartment by way of the conduit 28. Due to the fact that the conduit 30 is located exteriorly of the cabinet sufficient condensation forms in the conduit 30 to supply moisture to rolls, buns or bread to keep the same in a fresh state for a relatively long period of time.

Normally the heat supplied to the chamber by way of the conduit 30 and the moisture passing from the conduit 30 into the conduit 28 co-acts in producing a condition in the compartment which retains the rolls or bread fresh for a maximum period of time. However, should it be desired to soften dried or partially stale rolls or bread the valve 29 will be opened to permit steam from the boiler or steamer 8 to pass into the compartment.

Arranged in divergent relation within the casing or cabinet 5 at the upper end thereof is a pair of baffle walls 34, one of which has its lowered end positioned below the lower end of the other and terminates in an upstanding flange or gutter 35. A drain tube 36 leads to the lower end of this baffle wall and extends downwardly through the casing or cabinet with its lower end arranged to return condensation from the baffle walls to the boiler or steamer 8. These baffle walls 34 also serve to effectively distribute the heat throughout the compartments.

What is claimed is:—

1. In a cooking and serving cabinet, a casing having an opening in one side, a food compartment at the top thereof, a boiler extending the entire area of the casing and supported therein below the food compartment, a shelf supported on the boiler, a cooking utensil removably supported on the shelf, means for conducting steam from the boiler to the compartment at will, heating means for the boiler, over-lapping baffle walls arranged at the top of the casing, and a drain pipe leading from one of the baffle walls to conduct products of condensation therefrom.

2. In a cooker, a casing, a compartment at the top thereof, a steam conducting conduit communicating with the compartment, over-lapping baffle walls arranged at the top of the compartment, and a drain pipe extending from one of the baffle walls to a point remote therefrom for conducting condensation from the compartment.

CLAIR GILBERT WRIGHT.